Nov. 10, 1959  E. J. BRADY ET AL  2,912,612
ELECTRODE WIRE FEEDING SYSTEM
Filed Jan. 8, 1958  2 Sheets-Sheet 1

INVENTORS
EDWARD J. BRADY
CLAIRE BOND MARSHALL
BY
ATTORNEY

INVENTORS
EDWARD J. BRADY
CLAIRE BOND MARSHALL
BY
ATTORNEY

United States Patent Office 2,912,612
Patented Nov. 10, 1959

2,912,612

ELECTRODE WIRE FEEDING SYSTEM

Edward J. Brady and Claire Bond Marshall, York, Pa., assignors to Alloy Rods Company, York, Pa., a corporation of Pennsylvania Application January 8, 1958, Serial No. 707,745

3 Claims. (Cl. 314—72)

This invention relates to an electrode wire feeding system and, more particularly, to such a system applicable to the feeding of a substantially continuous length of wire electrode automatically for arc welding, the feed of the wire electrode being controlled in accordance with the demands of the weld.

In arc welding, it is common practice to arrange electrode wire of substantial length in a coil upon a reel and mount said reel upon a horizontal spindle, for example, whereby the outer end of the wire progressively is unwound from the reel which rotates about its axis, while feeding mechanism moves the outer end of the wire to an arc welding operation. Machines commonly in use employ reels which hold considerably less wire than is available in commercial reels or drums of such wire, whereby it is necessary to transfer wire from the commercial reels to the reels used upon such wire feeding machines now in use. This is a tedious operation. Further, mounting a loaded reel of even the smaller sizes such as now used upon the spindle of the machine requires considerable effort due to the weight of the loaded reel.

Due to the fact that the electrode wire is coiled upon a reel from which it is fed to the feeding means of the conventionally used machines described above, a curve in one or more directions is placed within the wire, this curve becoming more or less set. Hence, as the wire is uncoiled from the reel, and is led to an arc welding nozzle for example, said curve in the wire will cause friction to exist between the wire and the interior of the nozzle. Further, the outer end of the wire as fed progressively to the arc weld will oscillate undesirably to a certain extent, whereby the welder constantly will have to be on the alert to guide the wire desirably, especially where an even weld line or precise welded surface is desired. In an effort to minimize such oscillation of the electrode wire in machines presently in use, certain rather elementary attempts have been made to remove the curve from the uncoiled wire but only in one direction. This type of attempt to straighten the wire is not satisfactory for a number of reasons, one of these being that rarely does coiled wire have only a single curve therein or a curve within a single plane. Certain factors contribute to imposing compound curves in coiled wire, especially where the wire is initially uncoiled from a larger supply reel onto a smaller reel used in a wire feeding machine of the type referred to above. Such uncoiling and recoiling of the wire rarely is done with absolute accuracy, whereby it is practically impossible to eliminate oscillation of the wire at the arc as it is fed to the weld by machines now in use.

It is the principal object of the present invention to provide an electrode wire feeding system which has two primary advantages over existing machines and the systems now in use. One of these is that no intermediate reel is required by the machine in that electrode wire is fed to the feeding mechanism directly from a relatively large drum or reel of such wire as received from the factory. Further, the reel need only be laid upon one end on a horizontal surface such as a floor upon which the welding machine also is supported portably, whereby the reel is stationary and the axis thereof is substantially vertical. The outer end of the coil of wire upon the reel is fed to the feeding machine just as it is received from the mill.

The second advantage is that the feeding mechanism includes straightening means comprising a pair of straightening roll units respectively disposed transversely to each other, whereby the wire effectively is rendered completely straight when it leaves the feed roll of the device and is fed thereby to the arc welding nozzle, such thus straightened wire substantially completely eliminating any oscillation thereof at the arc as it is progressively fed thereto.

The foregoing object and advantages are achieved by utilizing relatively simple mechanism preferably enclosed within a substantially dust-tight cabinet positionable adjacent a drum or reel of electrode wire of large capacity and of the type received from a wire mill, the cabinet enclosing effective wire straightening units of the type referred to above and through which the wire is drawn for straightening progressively and substantially completely by a feed roll for delivery to a flexible and tubular guide and feed conduit connected at one end to the cabinet and at the other end to a conventional arc welding nozzle. The outer end of the wire upon the reel is uncoiled spirally and axially from said reel while the reel is stationary, the wire suitably being guided to the cabinet. The speed at which the feed roll of the unit is driven is variable in accordance with the required feed for any particular type of arc weld. Such feeding is accomplished automatically after the electric controls for the driving mechanism of the feed roll have been set to cause the feed roll to operate at the desired speed.

Details of the invention and other objects thereof are set forth in the following specification and illustrated in the accompanying drawings comprising a part thereof.

Figure 1:
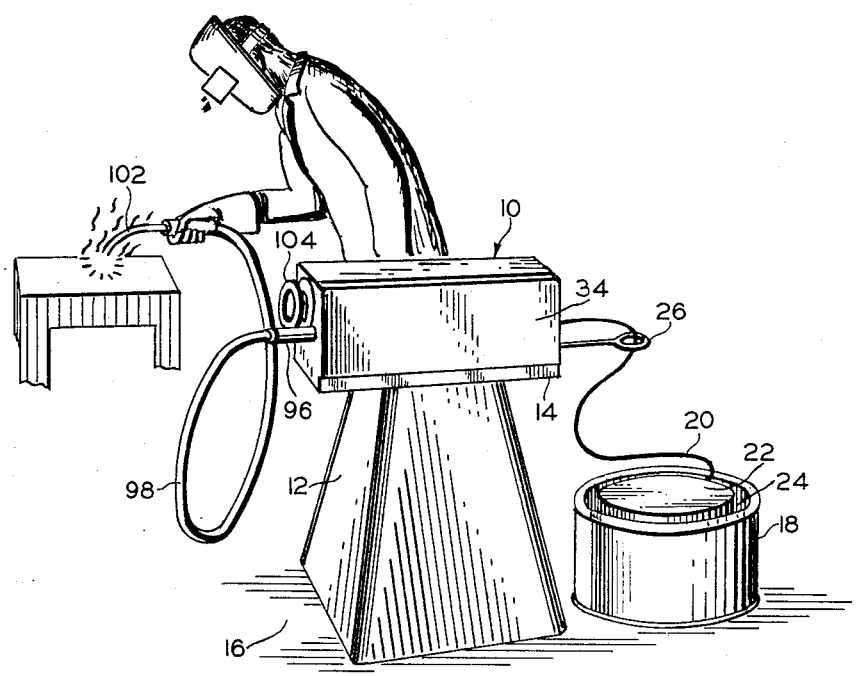
Fig. 1 is an exemplary perspective view illustrating the preferred embodiment of an electrode wire feeding system incorporating the principles of the present invention.

Referring to Fig. 1, in which one preferred embodiment of the present invention is illustrated, an electrode wire feeding unit 10 is shown mounted upon a standard-like base 12, the unit 10 being enclosed within a cabinet 14. Said base and feeding unit readily are portable by moving the same manually relative to a suitable supporting surface such as a floor 16. The weight of such unit and base is such that a welder readily may move the same to any desired position.

A stationary reel 18 is illustrated adjacent the base 12 of the unit, one end of the reel 18 being also positioned upon the floor 16. Such reel is of the type upon which electrode wire 20 is wound about a central hub portion 22, whereby the wire 20 is disposed in an annular space 24 within the reel 18. Such reels are used by manufacturers of electrode wire and the reels or containers hold a very substantial amount of such wire such, for example, as 100 pounds. The container or reel 18 also is provided with a suitable cover, not shown, whereby when the wire is not being fed to the feeding unit 10, the container 18 may be covered so as to prevent dirt and moisture, for example, from entering the container and contacting the electrode wire.

It will be seen that the reel 18, which actually may be a container within which a coil of the electrode wire 20 is shipped, only need be placed upon a substantially horizontal surface such as the floor 16, adjacent the base 12 of the feeding unit 10. Upon uncovering the container 18, the outer end of the coil of wire 20 is removed vertically from the upper end of container 18, spirally, and is fed through a suitable guide eyelet 26 through an insulated wire guide 28, see Fig. 2, into cabinet 14.

Figure 2:
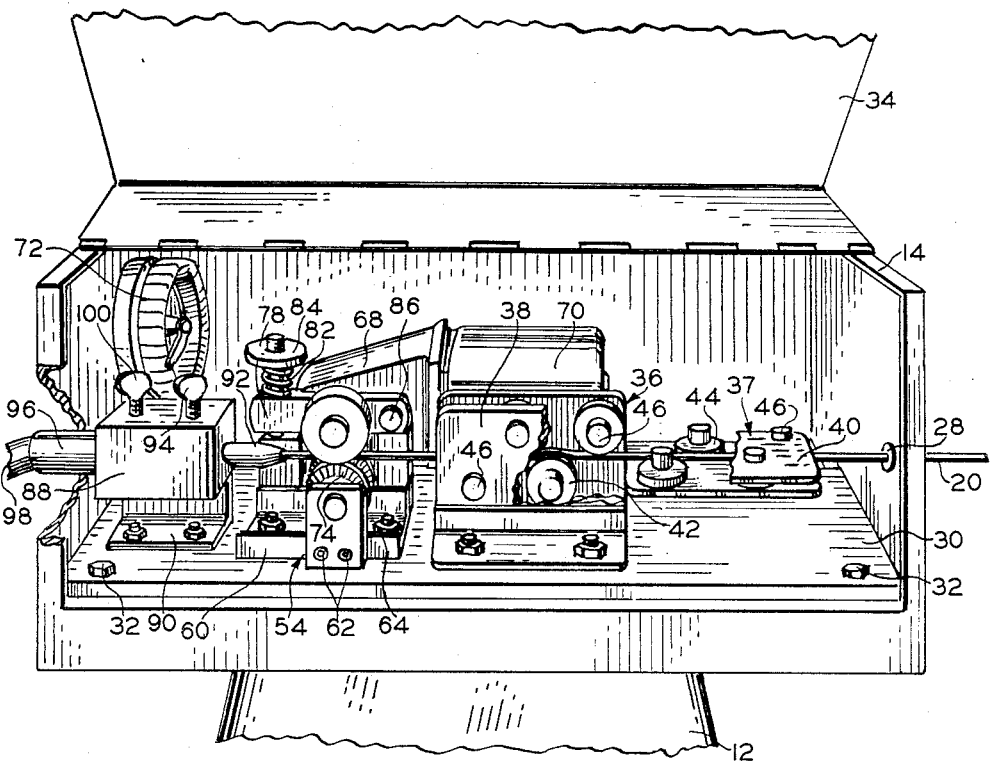
Fig. 2 is a perspective side view of the cabinet of such system shown with the door thereof open and certain parts being broken away so as better to illustrate the details of the invention, the cabinet including wire straightening, feeding, and guiding mechanism.
Figure 3:
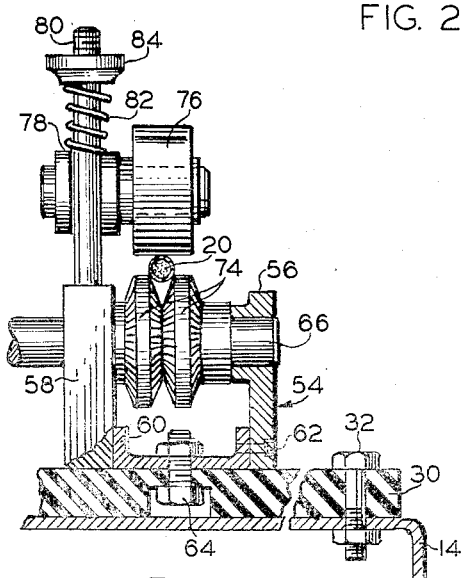
Fig. 3 is a fragmentary vertical elevation showing the delivery end of the feed roll and pressure roll, the same being illustrated as mounted upon a sheet of insulation material.
Figure 4:
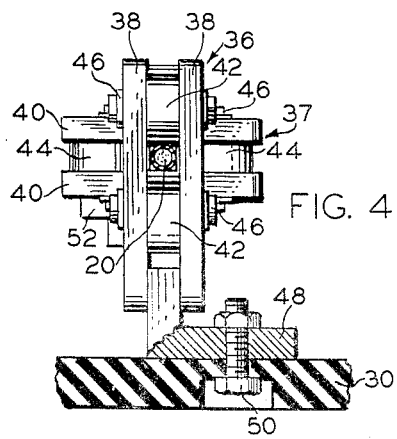
Fig. 4 is a fragmentary vertical end view showing the delivery end of the wire straightening units illustrated in Fig. 2, the same also being supported upon a sheet of insulation material.

Referring now particularly to Figs. 2 through 4, a base 30 of suitable electrical insulation material such as phenol-formaldehyde resin, or the like, is secured to the bottom of the cabinet 14 by bolts 32. The interior of the cabinet 14 may be rendered substantially dust proof by a hinged cover 34 and, when said cover is moved to open position as shown substantially in Fig. 2, one entire side and part of the top of the cabinet is exposed.

Secured to the base 30 is a wire straightening assembly comprising a pair of roll-type wire straightening units 36 and 37. Each of these units respectively comprise pairs of side plates 38 and 40, each pair thereof being spaced apart sufficiently to receive therebetween a plurality of straightening rolls 42 and 44. The rolls are supported between said plates by suitable pintles 46, upon which the rolls are freely rotatable. It will be understood also that the peripheries of the rolls in each unit are so related to each other that straightening of the wire 20 is achieved within the planes of the rolls as the wire passes therebetween.

It will be seen from Figs. 2 and 4 particularly that the side plates 38 are substantially vertical and the lower edges are connected to a bracket 48 which is bolted or otherwise secured to insulating base 30 by means such as bolts 50, the heads of which are recessed into the lower surface of the base 30, whereby said heads will not contact the metallic bottom of cabinet 14 for example. The lowermost side plates 40 of the straightening unit 37, which unit is disposed substantially horizontally, is connected to one web of a bracket 52, see Fig. 4, and another web thereof is connected to the innermost side plate 38 of unit 36, whereby unit 36 supports straightening unit 37. Further, the outer end of straightening unit 37 is adjacent the insulated wire guide 28. As is particularly evident from Fig. 4, it will be seen that the straightening units 36 and 37 are transverse to each other, whereby straightening of the wire 20 in two planes respectively transverse to each other is achieved, thereby producing a substantially completely straight wire, notwithstanding the spiralling thereof during the removal of the wire from the stationary container or reel 18. Such spiralling is indicated in an exemplary manner in Fig. 1.

Also connected to insulating base 30 is a feed roll unit 54. Said unit comprises an upright bearing member 56 and an upright plate 58, between which a base member 60 is disposed and opposite edges thereof respectively are connected to the lower portions of plate 58 and bearing member 56. The connection between plate 58 and base member 60 may be permanent if desired, while the bearing member 56 preferably is detachably connected thereto by a plurality of screws 62. Base member 60 is connected to insulating base 30 by a plurality of bolts 64, or any other suitable means, the heads of which preferably are recessed into the lower surface of insulating base 30, as clearly shown in Fig. 3.

Extending between axially aligned bearings within the plate 58 and bearing member 56 is a drive shaft 66 which projects at one end from a gear reduction unit 68 connected to a preferably D.C. electric motor 70. Inasmuch as D.C. current is used to operate an arc welding unit, the motor 70 utilizes the same source of D.C. power and variable speeds for the motor 70 are achieved by use of a variable resistance such as a rheostat 72.

Fixed to the drive shaft 66 are a pair of parallel feed rolls 74 which preferably are reversible, said rolls being connected non-rotatably to shaft 76 by suitable key means, not shown. As is best shown in Fig. 3, opposite sides of the feed roll 74 are beveled and are radially serrated so as to afford frictional engagement with the electrode wire 20, such engagement being assured by a pressure roll 76 rotatably supported by an arm 78 which is notched at one end to receive a threaded shaft 80 upon which is mounted a coiled pressure spring 82. A threaded thumb nut 84 is adjustable so as to vary the compression force exerted by spring 82 upon arm 78 and pressure roll 76. The other end of arm 78 is pivotally connected at 86 to an extension of upright plate 58. The space which receives the electrode wire 20 between feed rolls 74 and pressure rolls 76 is axially aligned with the path of the wire through the straightening units 36 and 37 and such path is substantially horizontal.

Additionally carried by the insulating base 30 is a supporting block 88, the base 90 of which is connected by bolts to the upper surface of the insulating base 30, said bolts being similar to bolts 64 by which the feed roll unit is connected to said base, as shown in Fig. 3. Hence, suporting block 88 likewise is insulated from the cabinet 14. Block 88 has a cylindrical passageway therethrough in axial alignment with the path of movement of the wire 20 through the feed roll unit and straightening roll units. One end of said passageway receives a cylindrical guide sleeve 92 which is adjustable longitudinally and is maintained in desired adjustment toward and from the feed roll unit by a wing screw 94 threaded into the block 88. The opposite end of the cylindrical opening in block 88 is larger than that which receives guide sleeve 92 and said opposite end receives the cylindrical coupling 96 on one end of the flexible tubular guide and feed conduits 98. The coupling 96 is detachably connected to block 88 by another wing screw 100 threaded into the block, as clearly shown in Fig. 2. The opposite end of conduit 98 has an arc welding nozzle 102 connected thereto and through which the outer end of the electrode rod 20 passes while forming a weldment such as illustrated in exemplary manner in Fig. 1.

The unit 10, on cabinet 14, also is provided with a control knob 104 by which the rheostat 72 is regulated so as to cause motor 70 to actuate feed rolls 74 at a speed required to feed the electrode wire 20 to nozzle 102 at a desired rate in accordance with a specific weldment being formed. It also will be understood that the complete circuit of the arc welding system is not illustrated since the same is conventional and includes leads from a D.C. welder unit, a ground wire connected to the workpiece, and the like.

Figures 5, 6:
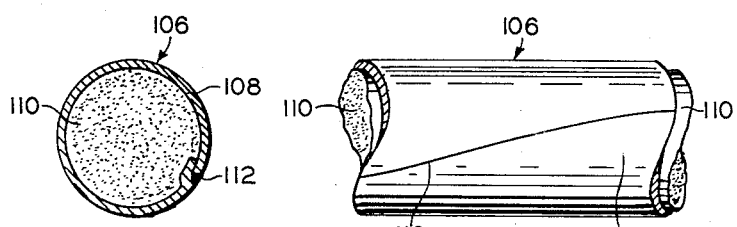
Fig. 5 is an enlarged fragmentary section of one type of wire electrode which is capable of being fed by the feeding system illustrated in the preceding figures.
Fig. 6 is a vertical sectional view of the wire electrode shown in Fig. 5.

The electrode wire feeding system comprising the present invention is adapted to feed either solid wire electrode or a fabricated electrode 106 such as is illustrated specifically in Figs. 5 and 6. Such fabricated electrode comprises a cylindrical metallic sheath 108 within which compacted metallic powders 110 are contained. An overlapping seam 112 is used to enclose the metallic powders 110, not only to hold the same in usable form, but also to exclude the contact of moisture therewith. Such fabricated electrode usually is formed by passing the same through extruding dies which decrease the diameter of the fabricated electrode and also highly compresses the powders 110 into substantially solid form.

Even when the feeding unit 10 is used to feed fabricated electrode wire 106, the straightening units 36 and 37, as well as the feed rolls 74 and pressure roll 76 is not deformed to any determinable extent and remains substantially cylindrical as furnished by the manufacturer.

By reason of the fact that the generically illustrated electrode wire 20 is removed spirally from one end of the reel or container 18 and passes through guide eyelet 26 to the straightening roll units 36 and 37, the wire will be spirally twisted in an axial direction and such spiral twisting will remain in the wire event after it has been straightened and is fed through the feed conduit 98 to the welding nozzle 102. Such spiral twist of the wire is illustrated somewhat in exaggerated form in Fig. 5 by the spiral configuration of the overlapping seam 112. A similar twist will exist even in solid electrode wire when fed by the unit 10. However, said spiral is of no adverse consequence because the wire is axially straight when it is fed by the feed roll unit 54 to the entrance end of feed conduit 98.

Very limited clearance between the interior of feed conduit 98 and the exterior of the conduit wire 20 is provided in order that the wire may be pushed through said conduit 98 easily and with a minimum of friction. Due to the fact that the wire is straight when fed to the conduit, such passage of the wire therethrough with a minimum amount of friction is assured. Further, the conduit 98 preferably is relatively stiff so that it is not capable of being bent into curves of short radius, thus further insuring that the electrode wire will be substantially straight as it emerges from the outer end of nozzle 102, thus resulting in no appreciable oscillation of the wire at the arc.

From the foregoing, it will be seen that the electrode wire feeding unit and system comprising the present invention provide means whereby a relatively simple feeding unit will accept electrode wire from a stationary reel or container in coil form, whereby the coil need not be mounted upon a spindle for rotation as now is required in conventional machines, and the spiralling wire, when passed to the feed unit 10, is straightened in a plurality of planes transverse to each other by a plurality of straightening roll units through which it is pulled by a feed roll unit. The feed roll unit also pushes the straightened wire through a flexible guide and feed conduit through an arc welding nozzle while the wire is maintained substantially straight and is fed in such condition from the outer end of the nozzle so as to prevent oscillation of said wire occurring at the arc. The feeding unit is relatively small as compared with conventional feeding units used to feed electrode wire to arc welding operations. Further, the entrance end of the guide and feed conduit is readily detachable from the feeding unit, especially for purposes of introducing the leading end of an electrode wire into the conduit, after which the entrance end of the conduit quickly is attachable to the feeding unit by connecting the same to a supporting block and anchoring it by a wing screw.

At the commencement of the operation of loading the outer end of a coil of electrode wire into the feeding unit, it is only necessary to reasonably straighten about six or eight inches of the outer end of such electrode wire, preferably filing or otherwise smoothing the exterior surface thereof, whereupon said leading end is passed through the straightening roll units 36 and 37, the feed roll unit 54, and into guide sleeve 92. A suitable switch for controlling the driving motor 70 then is operated momentarily until a few inches of the leading end of the wire extend beyond the supporting block 88. The entrance end of the conduit 98 then is fitted to said projecting end of the electrode wire and is anchored into place in the supporting block 88. The motor 70 then is further operated, preferably intermittently, until several inches of the outer end of the electrode projects beyond the nozzle 102. Welding operations then may commence and the motor 70 is set for continuous operations as controlled by the requirements of the welding operation, such requirements being determined beforehand and the control for the motor, such as knob 104, being adjusted accordingly to insure the desired operational speed of motor 70.

While the invention has been described and illustrated in its several preferred embodiments, and has included certain details, it should be understood that the invention is not to be limited to the precise details herein illustrated and described since the same may be carried out in other ways falling within the scope of the invention as claimed.

We claim:

1. An electrode wire feeding system comprising in combination, a stationary reel from which electrode wire is removed by uncoiling the same spirally from one end of said reel, a cabinet, standard-like supporting means connected to the lower portion of said cabinet and positionable upon a substantially horizontal surface to support said cabinet conveniently thereabove, insulation means mounted within said cabinet, driven feed roll means supported by said insulation means and operable to effect removal of said wire from said stationary coil continuously as required to be fed to an arc-welding operation, a flexible tubular guide and feed conduit having a nozzle on the outer end thereof, the other end thereof being supported by said insulation means and positioned to receive electrode wire from said feed roll means and to push said wire through said conduit, and wire straightening means mounted upon said insulation means adjacent said feed roll means and operable to straighten said electrode wire within two planes substantially transverse to each other, whereby said wire will be substantially straight when introduced into said guide and feed conduit and thereby minimize friction between said wire and the interior of said conduit and insure feeding of the electrode wire accurately to the arc at the end of said nozzle without oscillation.

2. The electrode wire feeding system set forth in claim 1 further including a support block mounted upon said insulation means and having an opening therethrough aligned axially with said feed roll and the path of wire through said straightening means, said block having means in one end to receive said other end of said flexible tubular guide and feed conduit for connection to said block, and a guide sleeve adjustably received within the opposite end of said block and extending toward said feed roll.

3. The electrode wire feeding system set forth in claim 1 further characterized by said stationary reel having one end also arranged to be positioned upon said substantially horizontal surface for support, whereby the axis of said reel is substantially vertical and the upper end of the reel is unobstructed for the free removal of wire therefrom spirally, and guide means fixed relative to said cabinet and positioned to pass and guide wire from said upper end of said reel to the wire straightening means in said cabinet, whereby kinking of said wire is minimized during feeding movement thereof.

References Cited in the file of this patent

UNITED STATES PATENTS

| | | |
|---|---|---|
| 1,508,711 | Noble | Sept. 16, 1924 |
| 1,524,557 | Kenyon | Jan. 27, 1925 |